(12) United States Patent
Yamanoue

(10) Patent No.: US 9,293,987 B2
(45) Date of Patent: Mar. 22, 2016

(54) DIFFERENTIAL DRIVER FOR INDUCTIVE LOAD

(71) Applicant: Visteon Global Technologies Inc., Van Buren Township, MI (US)

(72) Inventor: Kouichi Yamanoue, Hiroshima (JP)

(73) Assignee: Visteon Global Technologies, Inc., Van Buren Township, MI (US)

( * ) Notice: Subject to any disclaimer, the term of this patent is extended or adjusted under 35 U.S.C. 154(b) by 444 days.

(21) Appl. No.: 13/860,286

(22) Filed: Apr. 10, 2013

(65) Prior Publication Data

US 2013/0265018 A1 Oct. 10, 2013

(30) Foreign Application Priority Data

Apr. 10, 2012 (JP) .................. 2012-089402

(51) Int. Cl.
*G05F 1/00* (2006.01)
*H02M 3/156* (2006.01)
*H02M 3/158* (2006.01)
*H02M 3/155* (2006.01)

(52) U.S. Cl.
CPC .............. *H02M 3/156* (2013.01); *H02M 3/158* (2013.01); *H02M 2003/1555* (2013.01)

(58) Field of Classification Search
CPC ..... H02M 3/155; H02M 3/156; H02M 3/158; H02M 3/1582; H02M 3/1584; H02M 3/1588; H02M 2003/1555; H02M 2003/1566
USPC .......... 323/271, 282, 286, 289; 327/392–394, 327/396, 398, 399, 419, 423–424, 427, 432
See application file for complete search history.

(56) References Cited

U.S. PATENT DOCUMENTS

| 6,061,258 | A | * | 5/2000 | Galbiati | ............ | H02M 7/53871 363/17 |
| 2001/0010458 | A1 | * | 8/2001 | Ohshima | ............ | H03K 17/0822 323/282 |
| 2002/0005748 | A1 | | 1/2002 | Inoue et al. | | |
| 2012/0112531 | A1 | * | 5/2012 | Kesler | ................... | B60L 11/182 307/9.1 |
| 2012/0319499 | A1 | * | 12/2012 | Ooishi | .................. | H02M 3/156 307/104 |

OTHER PUBLICATIONS

First Office Action for corresponding pending German application dated Dec. 3, 2014, 5 pages with translation.

\* cited by examiner

*Primary Examiner* — Gary L Laxton
*Assistant Examiner* — Kevin H Sprenger
(74) *Attorney, Agent, or Firm* — Klintworth & Rozenblat IP LLC

(57) ABSTRACT

A small and low-cost load driving circuit device that reduces common mode noise without using a transformer, has a first switching arrangement provided between a high potential source and a terminal of an electrical load; a second switching arrangement provided between ground and the other terminal of the electrical load; a control arrangement that controls the first and second switching arrangements so as to simultaneously disconnect each other with the same frequency and the same duty ratio; and a synchronization arrangement that synchronizes the disconnect timing of the first switching arrangement and the disconnect timing of the second switching arrangement.

17 Claims, 5 Drawing Sheets

DIFFERENTIAL DRIVER FOR INDUCTIVE LOAD

RELATIONSHIP TO OTHER APPLICATION

This application is a United States National Filing under 35 U.S.C. §119 that claims the benefit of Japanese Patent Application Number 2012-089402, filed Apr. 10, 2012 with the Commissioner of the Japan Patent Office, the disclosure of which is incorporated herein by reference to the fullest extent permitted under law.

BACKGROUND OF THE INVENTION

1. Field of the Invention

This invention relates generally to a load driving circuit device, and more specifically, to a load driving circuit device that can reduce common mode noise.

2. Description of the Related Art

FIG. 7 is a simplified circuit schematic representation of a conventional load driving circuit device. As shown in this figure, load driving circuit device 101 and electrical load 130, such as a motor, solenoid, or lamp, are connected by two parallel wiring harnesses 120a and 120b. One of wiring harnesses 120a is connected to a terminal 141 on the high potential side of a direct current power supply. The other wiring harness 120b is connected to the low potential side of the direct current power supply—that is, ground—via a switching means 113 of load driving circuit device 101. Power supplied to the electrical load is pulse width modulation controlled by turning on and off switching means 113 with a high frequency.

The potential of wiring harnesses 120a with respect to ground is fixed at the potential of the high potential side of the direct current power supply. In contrast, the potential of the other wiring harness 120b changes repeatedly between ground potential and the power supply voltage according to on/off of switching means 113. For this reason, the average potential of the two wiring harnesses 120a and 120b with respect to ground potential—that is, common mode potential Vcom—also changes repeatedly between "½×power supply voltage" and "power supply voltage." It is known that common mode noise is generated as a result.

There is a need, therefore, for a circuit arrangement that will drive a load, particularly an inductive load, while suppressing common mode noise.

The prior art has sought to alleviate the problem of common mode noise by causing the potential of the wiring harness on the positive electrode side and the potential of the wiring harness on the negative electrode side to fluctuate symmetrically. As a result, the common mode potential is fixed, and its fluctuation is suppressed. In this manner, common mode current is reduced and the generation of common mode noise is suppressed. However, the known arrangement requires that a transformer be arranged on the output side of the load driving circuit device. Thus, both the size and the cost of the load driving circuit device are disadvantageously increased. In the case of a large load current, the transformer must also be large, and as a result, such problems become particularly troublesome.

It is, therefore, an object of this invention to provide a small, low-cost load driving circuit device that reduces common mode noise without requiring the use of a transformer.

SUMMARY OF THE INVENTION

The foregoing and other objects are achieved by this invention, which provides a load driving circuit device that PWM controls the supply of power to an electrical load. The load driving circuit device is provided with a first switching arrangement that is connected between a terminal on the high potential side of a direct current power supply and one terminal of the electrical load, a second switching arrangement that is connected between a terminal on the low potential side of the direct current power supply and the other terminal of the electrical load, a control arrangement that controls the first switching arrangement and second switching arrangement so as to simultaneously disconnect each other with the same frequency and the same duty ratio, and a synchronization arrangement that synchronizes the disconnect timing of the first switching arrangement and the disconnect timing of the second switching arrangement.

Thus, according to the present invention, a first switching arrangement and a second switching arrangement are provided on the high potential side and the low potential side, respectively, of a direct current power supply, and are configured to disconnect the electrical load. As a result, the high potential side output and low potential side output of the load driving circuit device can independently be disconnected. For this reason, the change in potential of the wiring harness on the high potential side and the change in potential of the wiring harness on the low potential side can be made symmetrical without requiring the use of a transformer. As a result of the present simple circuit structure, noise that is radiated from the wiring harnesses is reduced without causing changes in the common mode potential.

In one embodiment of the invention, the disconnect timing relationship between the first switching arrangement and the second switching arrangement is controlled by a synchronization arrangement. Therefore, synchronicity between the voltage change of the high potential side output and the voltage change of the low potential side output of the load driving circuit device is optimally adjustable. Consequently, fluctuation in the common mode potential is easily suppressed.

In a specific illustrative embodiment of the invention, the synchronization arrangement includes a first feedback circuit that is configured so as to switch the first switching arrangement from the "on" state to the "off" state when the second switching arrangement is switched from "on" to "off," and to switch the first switching arrangement from "off" to "on" when the second switching arrangement is switched from "off" to "on," and a second feedback circuit configured so as to switch the second switching arrangement from "on" to "off" when the first switching arrangement is switched from "on" to "off," and to switch the second switching arrangement from "off" to "on" when the first switching arrangement is switched from "off" to "on."

Thus, as a result of the operation of the first feedback circuit, the first switching arrangement is disconnected instantly in response to disconnection of the second switching arrangement. Also, as a result of the operation of the second feedback circuit, the second switching arrangement is disconnected instantly in response to disconnection of the first switching arrangement. For this reason, the disconnect operation is easily synchronized between the first switching arrangement and the second switching arrangement. As a result, the noise that is radiated from the wiring harnesses is reduced without changes in common mode potential.

In a further embodiment of the invention, the control arrangement simultaneously outputs a first-level first control signal and a third-level second control signal, and simultaneously outputs a second-level first control signal that is lower than the first-level and a fourth-level second control signal that is higher than the third-level. The first switching arrangement includes a first terminal that is connected to a terminal on the high potential side of the direct current power supply, a second terminal that is connected to one terminal of the electrical load, and a first control terminal to which the first control signal is delivered from the control arrangement. Thus, when the first control signal is first-level, it turns off and blocks the path between the first terminal and the second terminal, and when the first control signal is second-level, it turns on and connects the path between the first terminal and the second terminal. The second Switching arrangement includes a third terminal that is connected to a terminal on the low potential side of the direct current power supply, a fourth terminal that is connected to the other terminal of the electrical load, and a second control terminal into which the second control signal is input from the control arrangement, wherein, when the second control signal is third-level, it turns off and blocks between the third terminal and the fourth terminal, and when the second control signal is fourth-level, it turns on and connects between the third terminal and the fourth terminal.

In this manner, the first and second switching arrangement can be simultaneously put in the "off" state by a first-level (H-level) first control signal and a second-level (L-level) second control signal that are simultaneously issued from the control arrangement. Moreover, the first and second switching arrangement are simultaneously switched to the "on" state by a third-level (L-level) first control signal and a fourth-level (H-level) second control signal that are simultaneously issued from the control arrangement.

In one embodiment the present invention, the first feedback circuit includes a first capacitor that is connected to the fourth terminal of the second switching arrangement and the first control terminal of the first switching arrangement, and the second feedback circuit comprises a second capacitor that is connected to the second terminal of the first switching arrangement and the second control terminal of the second switching arrangement. In this manner, a load driving circuit device that suppresses generation of common mode noise is configured at low cost.

In addition to the foregoing, when the second switching arrangement is in the "off" condition, a first feedback circuit applies the potential of the terminal to the high potential side of the direct current power supply to the first control terminal of the first switching arrangement, and when the potential of the first control terminal is the potential of the terminal on the high potential side of the direct current power supply, the first switching arrangement turns off, and when the first switching arrangement is off, the second feedback circuit applies the potential of the terminal on the low potential side of the direct current power supply to the second control terminal of the second switching arrangement, and when the potential of the second control terminal is the potential of the terminal on the low potential side of the direct current power supply, the second switching arrangement turns off.

In this manner, when the second switching arrangement turns off, the potential of the terminal on the high potential side of the direct current power supply is applied to the first control terminal of the first switching arrangement, and the first switching arrangement also turns off. Also, when the first switching arrangement turns off, the potential of the terminal on the low potential side of the direct current power supply, illustratively ground potential, is applied to the second control terminal of the second switching arrangement, and the second switching arrangement also turns off. By so doing, the first switching arrangement and the second switching arrangement are synchronized.

BRIEF DESCRIPTION OF THE DRAWING

Comprehension of the invention is facilitated by reading the following detailed description, in conjunction with the annexed drawing, in which.

DETAILED DESCRIPTION

Figure 1:
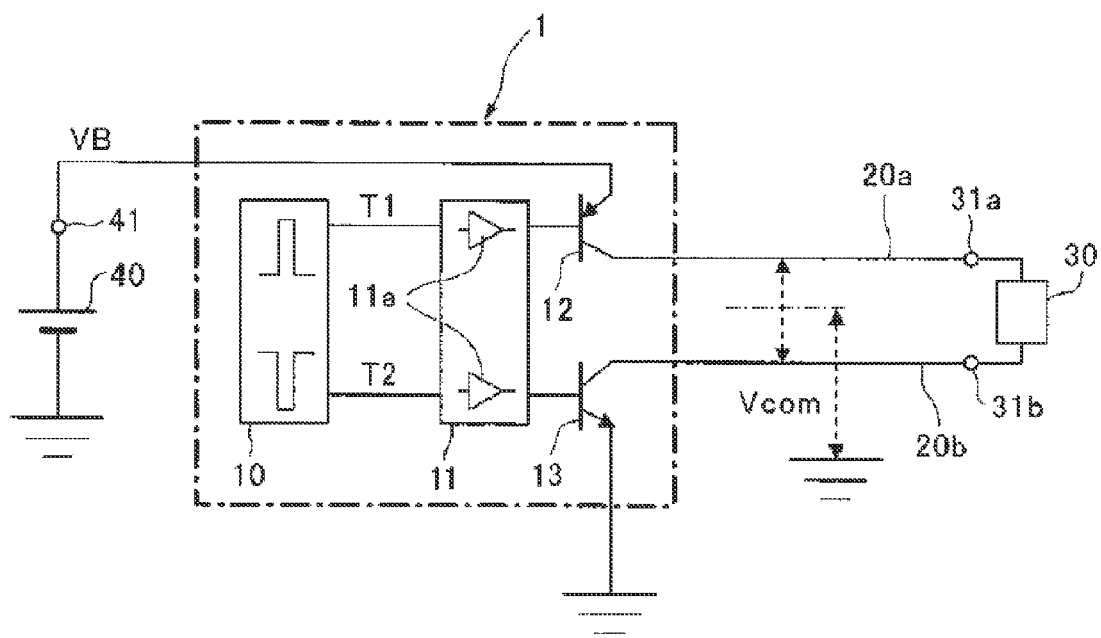
FIG. 1 is a circuit diagram of a load driving circuit device according to a first illustrative embodiment of the present invention.

Embodiments of the present invention will be described below with reference to the drawings. The following is a list of some of the reference numerals, as used in the drawing figures:

1 Load driving circuit device
10 Control arrangement
11 Synchronization arrangement
12 First switching arrangement
12a and 13a Resistor
13 Second switching arrangement
20a and 20b Wiring harness
30 Electrical load
31a and 31b Terminals
40 Power supply
41 Terminal
101 Load driving circuit device
111 First feedback circuit
112 Second feedback circuit
111a Transistor
112a Transistor
111b Transistor
112b Transistor
111c First capacitor
112c Second capacitor
113 Switching means
120a and 120b Wiring harness
130 Electrical load
140 Power supply FIG. 1 shows a circuit diagram of a load driving circuit device constructed in accordance with a first embodiment of the present invention. The load driving circuit device illustrated in FIG. 1 comprises a control arrangement 10, a synchronization arrangement 11, a first switching arrangement 12 and a second switching arrangement 13. First switching arrangement 12 and an electrical load 30 are connected via a first wiring harness 20a. Also, the second switching arrangement 13 and the electrical load 30 are connected via a second wiring harness 20b.

Control arrangement 10 controls first switching arrangement 12 and the second switching arrangement 13 so as to disconnect each other simultaneously with the same frequency and the same duty ratio. By so doing, the power supplied to electrical load 30 is PWM controlled. Control arrangement 10 has a first terminal T1 and a second terminal T2. A first control signal is output from first terminal T1, and a second control signal is output from second terminal T2. Control arrangement 10 simultaneously outputs a first-level (H-level) first control signal and a third-level (L-level) second control signal, and also simultaneously outputs a second-level (L-level) first control signal that is lower than the first-level (H-level) and a fourth-level (H-level) second control signal that is higher than the third-level (L-level).

The electricity to electrical load 30 is disconnected with a prescribed frequency (for example, 25 KHz) according to the duty ratio of the first and second control signals output from control arrangement 10. As a result, the average power applied to the electrical load is PWM controlled, and the rotational speed of a motor or brightness of a lamp employed as electrical load 30 is variably controlled.

In addition to the foregoing, synchronization arrangement 11 synchronizes the disconnect timing of first switching arrangement 12 and the disconnect timing of second switching arrangement 13. Synchronization arrangement 11 is constructed of, for example, a known buffer circuit 11a. The propagation delay time of the output signal varies in response to the input signal variations of buffer circuit 11a and the rise and fall rate of the output signal can be individually adjusted independently.

First switching arrangement 12 is connected between a terminal 41 on the high potential side of a direct current power supply 40 and one of terminals 31a of electrical load 30. First Switching arrangement 12 is a pnp bipolar transistor comprising an emitter (first terminal) that is connected to terminal 41 on the high potential side of direct current power supply 40, a collector (second terminal) that is connected to one of terminals 31a of electrical load 30, and a base (first control terminal) into which a first control signal is input from control arrangement 10. In the pnp bipolar transistor, when the first control signal is first-level (H-level), it turns off and blocks between the emitter and collector, and when the first control signal is second-level (L-level), it turns on and connects between the emitter and collector.

Note that the first-level (H-level) and second-level (L-level) voltages of the first control signal may be set in accordance with the operating characteristics of the pnp bipolar transistor of first switching arrangement 12.

Second switching arrangement 13 is connected between the terminal on the low potential side of direct current power supply 30—that is, ground—and terminal 31b of electrical load 30. Second switching arrangement 13 is an npn bipolar transistor comprising a terminal on the low potential side of the direct current power supply 40—that is, an emitter (third terminal) connected to ground, a collector (fourth terminal) connected to the other terminal 31b of electrical load 30, and a base (second control terminal) into which the second control signal is input from the control arrangement 10. In the npn bipolar transistor, when the second control signal is third-level (L-level), it turns off and blocks between the emitter and collector, and when the second control signal is fourth-level (H-level), it turns on and connects between the emitter and collector.

Note that the third-level (L-level) and fourth-level (H-level) voltages of the second control signal may be set in accordance with the operating characteristics of the npn bipolar transistor of the second switching arrangement 13.

Figure 2:
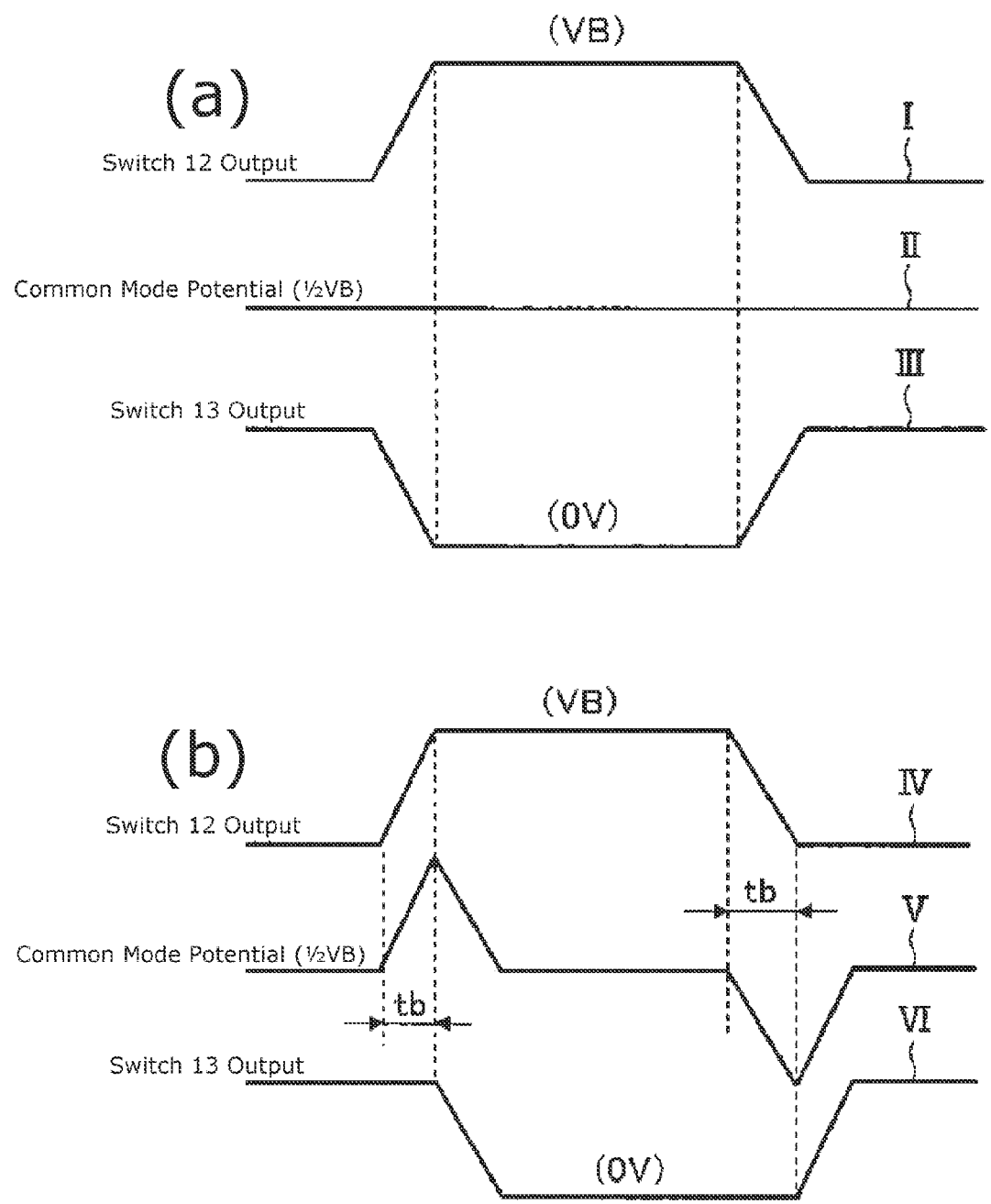
FIG. 2(a) is a diagram that illustrates the change in the common mode potential in the case where the disconnect timing of the first switching arrangement and second switching arrangement are synchronized.
FIG. 2(b) is a diagram that illustrates the change in the common mode potential in the case where the disconnect timing of the first switching arrangement and second switching arrangement are not synchronized.

Here, changes in common mode potential are shown in FIG. 2. FIG. 2(*a*) is a diagram illustrating the change in common mode potential in the case where the disconnect timing of the first switching arrangement 12 and second switching arrangement 13 are synchronized. FIG. 2(*b*) is a diagram illustrating the change in common mode potential in the case where the disconnect timing of the first switching arrangement 12 and second switching arrangement 13 are not synchronized.

Line I of FIG. 2(*a*) shows the change over time in output of the first switching arrangement 12—that is, the potential of first wiring harness 20a, and line III shows the change over time in output of second switching arrangement 13—that is, the potential of second wiring harness 20b. Line II shows the change over time in common mode potential, which is the average potential of wiring harness 20a and wiring harness 20b. Also, line IV of FIG. 2(*b*) shows the change over time in output of first switching arrangement 12—that is, the potential of the first wiring harness 20a, and line VI shows the change over time in output of the second switching arrangement 13—that is, the potential of second wiring harness 20b. Line V shows the change over time in common mode potential.

When first switch 12 is on, the potential of wiring harness 20a with respect to ground is VB, as indicated by curve I in FIG. 2(*a*). In this case, since switching arrangement 13 is also on at the same time, the potential of wiring harness 20b with respect to ground is 0 V, as indicated by curve III in FIG. 2(*a*). Therefore, the average potential Vcom of the wiring harness 20a and wiring harness 20b is ½ VB.

When first switching arrangement 12 is off, since switching arrangement 13 is also off at the same time, the voltages of the two terminals of the electrical load 30 are 0 V. In this case, the potential of wiring harness 20a and wiring harness 20b with respect to ground is substantially ½ VB, because the leak currents in the first switching arrangement 12 and second switching arrangement 13 when off are roughly equal. Therefore, as indicated by line II in FIG. 2(*a*), the common mode potential is always constant at substantially ½ VB.

Incidentally, in order to fix the common mode potential constant at ½ VB, the slopes of the timing of output voltage change of first switching arrangement 12 and second switching arrangement 13 must match during the transient period during which the first switching arrangement 12 and second switching arrangement 13 shift from on to off or from off to on.

However, if the timing of the disconnect operations of first switching arrangement 12 and second switching arrangement 13 is not synchronized, the average output potential of first and second switching arrangement 12 and 13 is not ½ VB during the transient period from on to off or from off to on of the switching arrangement, and as shown in FIG. 2(*b*), the common mode potential changes to the pulsed state. As a result, common mode noise ends up being generated from first and second wiring harnesses 20a and 20b.

Thus, in load driving circuit device 1 according to this embodiment, PWM signals output by control arrangement 10—that is, the first control signal and the second control signal—are input to synchronization arrangement 11, and are output from synchronization arrangement 11 to first switching arrangement 12 and second switching arrangement 13. By appropriately adjusting the characteristics of buffer circuit 11a that forms synchronization arrangement 11, the propagation delay time of output signal changes in response to input signal changes of buffer circuit 11a and the rise and fall rate of the output signal can be individually adjusted independently, and the output voltage transitions of the switching arrangement 12 and switching arrangement 13 in the transient period are made symmetrical. That is, as indicated by line I and line III in FIG. 2(*a*), buffer circuit 11a is adjusted such that the output value of first switching arrangement 12 and the output value of second switching arrangement 13 are symmetrical with respect to line II.

Figure 3:
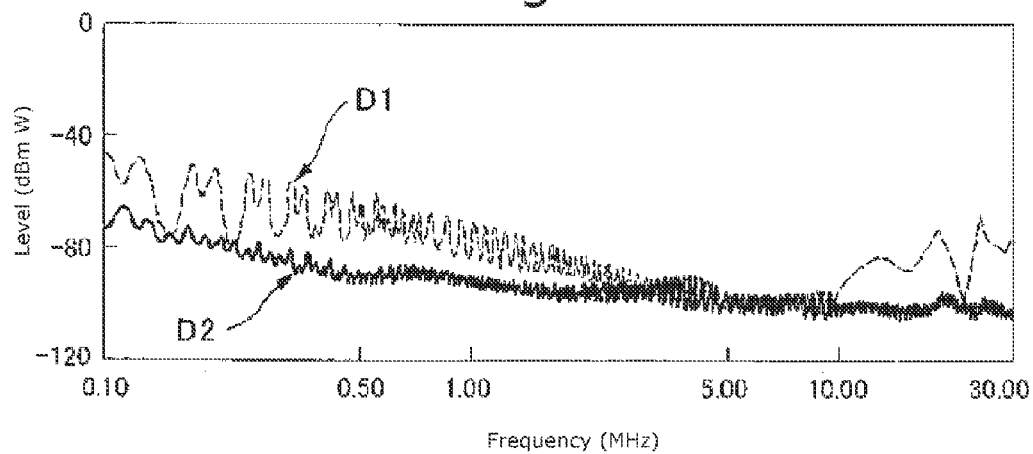
FIG. 3 is a graphical illustration that depicts the results of measuring wiring harness radiated noise.
Figure 7:
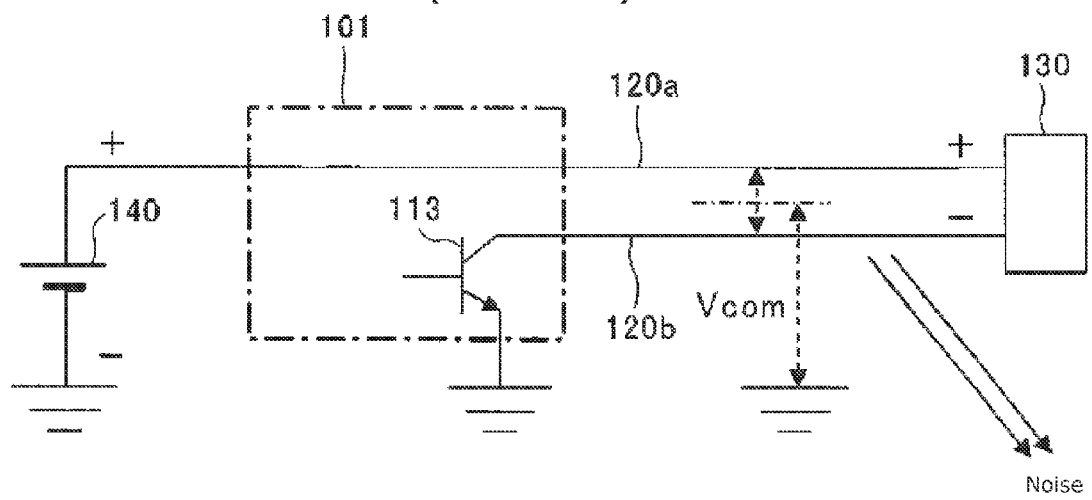
FIG. 7 is a circuit diagram of a conventional load driving circuit device.

Here, FIG. 3 is a graph illustrating the results of measuring wiring harness radiated noise. The horizontal axis of the graph represents the logarithm of the frequency (MHZ) of radiated noise, and the vertical axis represents the level (dBmW) of radiated noise. In the graph, curve D1 shows the results of measuring the magnitude of radiated noise using the conventional load driving circuit device shown in FIG. 7, under the conditions of power supply voltage=12 V, PWM frequency=25 KHz, PWM duty ratio=80%, load current=8 A, and wiring harness length=2 m. As shown by curve D1, radiated noise of a maximum of −50 dBmW was measured in the frequency region from 100 KHz to 30 MHZ.

In contrast, curve D2 in the graph shows the results of measuring the magnitude of radiated noise using the load driving circuit device according to this embodiment shown in FIG. 1 under the same conditions as above. As is understood by comparing curve D1 and curve D2, radiated noise decreases greatly when the load driving circuit device according to this embodiment is used.

Next, a load driving circuit device according to a second embodiment will be described.

Figure 4:
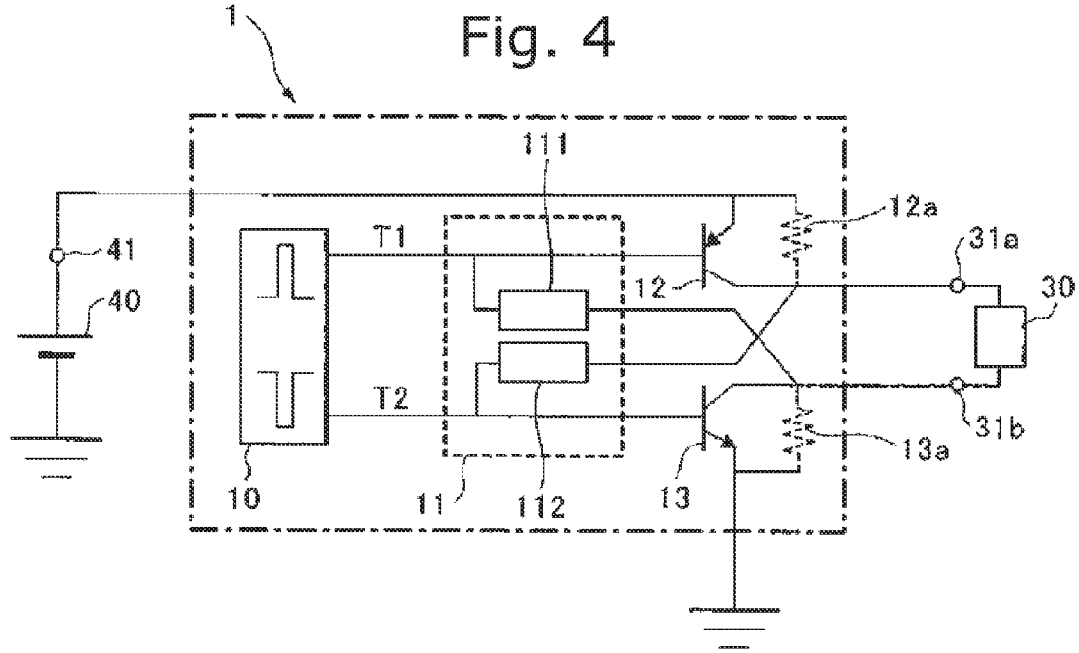
FIG. 4 is a circuit diagram of a load driving circuit device according to a second embodiment of the present invention.

FIG. 4 is a circuit diagram of a load driving circuit device according to a second embodiment. The configuration of the load driving circuit device according to the second embodiment is the same as that of the first embodiment except for synchronization circuit 11. The detailed descriptions of constituent elements that are the same as in the first embodiment will be omitted.

Synchronization circuit 11 in the load driving circuit device according to the second embodiment is constructed from a first feedback circuit 111, which performs signal transmission from the output terminal (collector) of the second switching arrangement 13 to the input terminal (base) of first switching arrangement 12, and a second feedback circuit 112, which performs signal transmission from the output terminal (collector) of first switching arrangement 12 to the input terminal (base) of second switching arrangement 13.

First feedback circuit 111 is configured so as to switch first switching arrangement 12 from on to off when second switching arrangement 13 is switched from on to off, and to switch first switching arrangement 12 from off to on when second switching arrangement 13 is switched from off to on. Also, second feedback circuit 112 is configured so as to switch second switching arrangement 13 from on to off when first switching arrangement 12 is switched from on to off, and to switch the second switching arrangement 13 from off to on when first switching arrangement 12 is switched from off to on.

Note that if the first and second switching arrangement 12 and 13 are off, the output common mode voltage Vcom is normally substantially ½ VB due to the leak current of first switching arrangement 12 and second switching arrangement 13 when off. However, there may also be cases where the output common mode voltage Vcom is not ½ VB when the first and second switching arrangement 12 and 13 are off, due to non-equilibrium of the bias current that flows from the second switching arrangement 13 to first feedback circuit 111 and the bias current that flows from first switching arrangement 12 to second feedback circuit 112. In this case, as shown in FIG. 4, a resistor 12a and resistor 13a of the same value may be respectively added to both terminals of first switching arrangement 12 and both terminals of second switching arrangement 13. However, even when electrical load 30 is in the off state, current continues to be supplied through resistor 12a and resistor 13a, and consequently, the resistance value of resistor 12a and resistor 13a should be selected so as to result in the minimum current.

Figure 5:
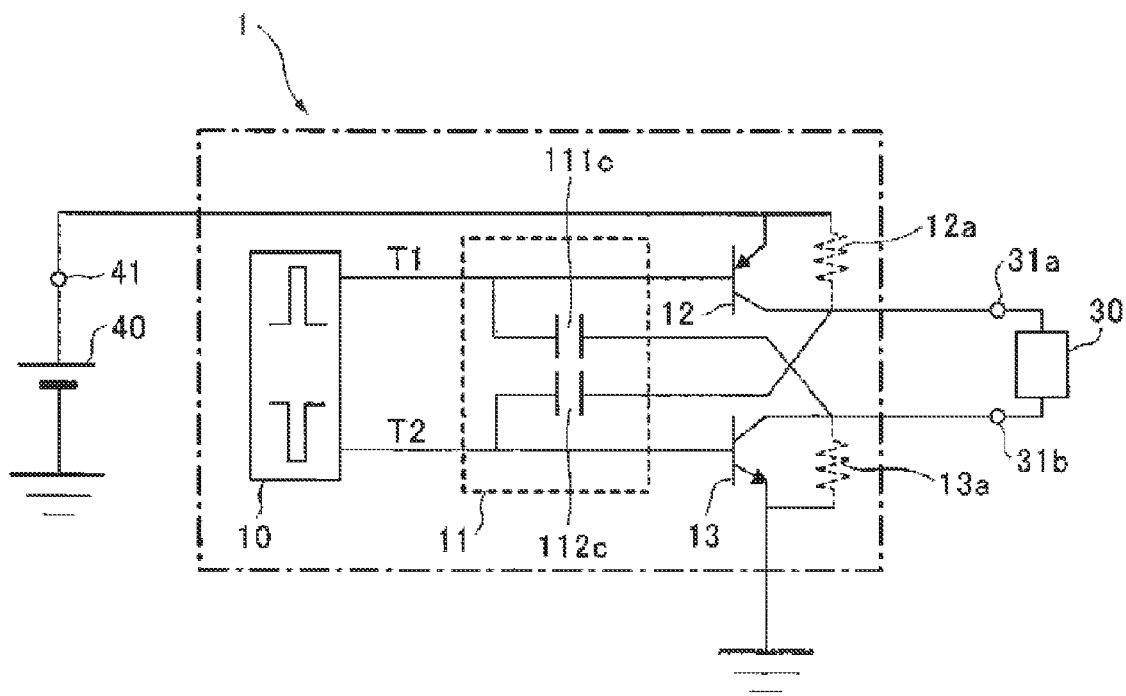
FIG. 5 is a more specific circuit diagram of a load driving circuit device according to the second embodiment of the present invention.

Additionally, FIG. 5 shows a more specific circuit diagram of the load driving circuit device according to the second embodiment. In the specific illustrative embodiment of the invention shown in FIG. 5, the first feedback circuit is a first capacitor 111c that is connected to the collector (fourth terminal) of second switching arrangement 13 and the base (first control terminal) of first switching arrangement 12. Also, the second feedback circuit is a second capacitor 112c that is connected to the collector (second terminal) of first switching arrangement 12 and the base (second control terminal) of second switching arrangement 13.

First capacitor 111c operates such that when second switching arrangement 13 turns off, it increases the input voltage of first switching arrangement 12 so as to turn off first switching arrangement 12 forcibly. First capacitor 111c also operates such that when switching arrangement 13 turns on, it decreases the input voltage of switching arrangement 12 so as to forcibly turn on first switching arrangement 12. Additionally, second capacitor 112c operates such that when first switching arrangement 12 turns off, it decreases the input voltage of second switching arrangement 13 so as to forcibly turn off second switching arrangement 13. Second capacitor 112c also operates such that when first switching arrangement 12 turns off, it increases the input voltage of second switching arrangement 13 so as to forcibly turn on the second switching arrangement 13.

By this configuration, first feedback circuit 111 and second feedback circuit 112 can be formed by a simple configuration without using a transistor. For this reason, a small load driving circuit device can be provided at low cost.

Next, a load driving circuit device according to a third embodiment will be described.

Figure 6:
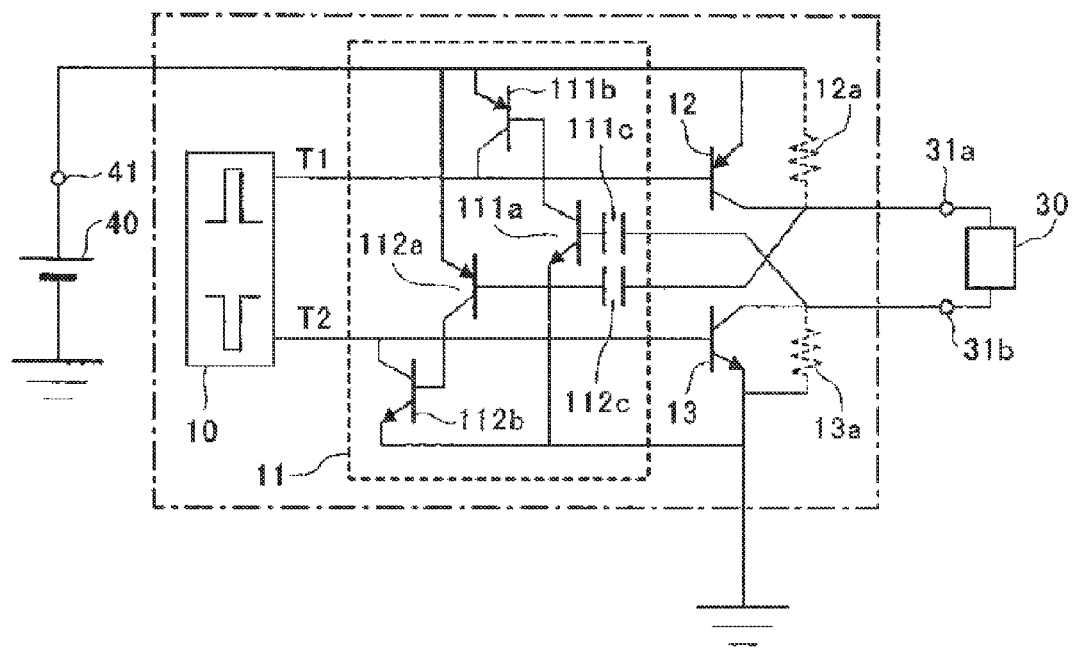
FIG. 6 is a circuit diagram of a load driving circuit device according to a third embodiment of the present invention.

FIG. 6 is a circuit diagram of a load driving circuit device constructed in accordance with a third embodiment of the embodiment. The configuration of the load driving circuit device according to the third embodiment is the same as those of the first and second embodiments except for synchronization circuit 11. The detailed descriptions of constituent elements that are identical to those in the first and second embodiments will be omitted. Moreover, elements of structure that have previously been discussed are similarly designated.

Synchronization circuit 11 in the load driving circuit device according to the third embodiment, as shown in FIG. 6, connects from the output terminal (collector) of second switching arrangement 13 to the input terminal (base) of first switching arrangement 12 via capacitor 111c, transistor 111a and transistor 111b, and forms first feedback circuit 111. Also, it connects from the output terminal (collector) of first switching arrangement 12 to the input terminal (base) of second switching arrangement 13 via capacitor 112c, transistor 112a and transistor 112b, and forms second feedback circuit 112.

When second switching arrangement 13 starts to transition from the "on" state to the "off" state, and the output voltage of second switching arrangement 13 starts to increase, transistor 111a turns on via capacitor 111c, and at the same time, transistor 111b turns on. As a result, when second switching arrangement 13 turns off, the potential (VB) of terminal 41 on the high potential side of direct current power supply 40 is applied to the base (first control terminal) of first switching arrangement 12. When the potential of this base (first control terminal) is the potential (VB) of terminal 41 on the high potential side of direct current power supply 40, first switching arrangement 12 turns off. For this reason, switching arrangement 12 is forcibly turned off regardless of the level of the output signal of the terminal T1 of control arrangement 10.

In addition to the foregoing, when second switching arrangement 13 starts to transition from the "off" state to the "on" state, and the output voltage of second switching arrangement 13 starts to decrease, transistor 111a turns off via capacitor 111c, and at the same time, transistor 111b turns off. As a result, a signal for control arrangement 10 to turn on switching arrangement 12 via terminal T1 is permitted, and switching arrangement 12 turns on.

Additionally, when first switching arrangement 12 starts to transition from on to off and the output voltage of first switching arrangement 12 starts to decrease, transistor 112a turns on via capacitor 112c, and at the same time, transistor 112b turns on. As a result, when first switching arrangement 12 turns off, potential of the terminal on the low potential side of direct current power supply 40, illustratively ground potential (0 V), is applied to the base (second control terminal) of second switching arrangement 13. When the potential of this base (second control terminal) is ground potential (0 V) of the terminal on the low potential side of direct current power supply 40, second switching arrangement 13 turns off. For this reason, second switching arrangement 13 is forcibly turned off regardless of the state of the output signal of terminal T2 of control arrangement 10.

When first switching arrangement 12 starts to transition from off to on and the output voltage of first switching arrangement 12 starts to increase, transistor 112a turns off via the capacitor 112c, and at the same time, transistor 112b turns off. As a result, a signal for control arrangement 10 to turn on switching arrangement 13 via terminal T2 is permitted, and second switching arrangement 13 turns on.

As described above, simply by transmission of a PWM signal that simultaneously disconnects switching arrangement 12 and switching arrangement 13 from terminal T1 and terminal T2 of control arrangement 10, first switching arrangement 12 and second switching arrangement 13 are controlled such that the disconnect timing and the rise and fall rate of the output signals of the switching arrangement are automatically matched by the action of feedback circuit 111 and feedback circuit 112.

Therefore, by operation of synchronization arrangement 11, which includes first and second feedback circuits 111 and 112 of this embodiment, the disconnect operations of the switching arrangement can be synchronized while maintaining stability even in cases when the input/output characteristics of first and second switching arrangement 12 and 13 change due to ambient temperature or individual non-uniformities. As a result, a load driving circuit device that better suppresses changes in common mode potential and has less noise generation is realized.

As described above, because the load driving circuit device of the present invention makes it possible to make the changes in potential with respect to ground of the voltage signals on both the high potential side and the low potential side output from the output terminal of the device completely targeted without using a transformer, it is possible provide an inexpensive small load driving circuit device in which the common mode potential does not change—that is, which suppresses generation of common mode noise.

It is to be noted that, in the embodiments hereinabove described, bipolar transistors have been used as the switching arrangement. However, the present invention is not limited thereto. For example, in other embodiments of the invention, a MOSFET, thyristor or IGBT may be used as a switching arrangement. Additionally, switch elements of the same structure may be used in the first switching arrangement of the high potential side and the second switching arrangement of the low potential side (for example, a known Nch-MOSFET in both, or an npn transistor in both), and a polarity inverting arrangement is, in some embodiments of the invention, added to either one of first or second feedback circuit 111 or 112.

In addition to the foregoing, in the case where electrical load 30 is a known inductive load, a known flyback diode is in some embodiments added to both terminals of the load in order to suppress generation of surge voltage when the load is off and to fix the current that flows into the load during PWM drive.

Furthermore, a conventional R-C snubber circuit is, in some embodiments, added between output of the first switching arrangement 12 and the output of second switching arrangement 13 (or between the output terminal and power supply of first switching arrangement 12, and between the output terminal and ground of second switching arrangement 13) in order to suppress surge noise by parasitic inductance of wiring harnesses 20a and 20b when they are turned on or off.

The configuration of first and second feedback circuits 111 and 112 used in the load driving circuit devices according to the embodiments described above is not limited to the configuration of the embodiments, and may freely be modified within a scope that does not deviate from the spirit of the present invention, namely to perform operation timing synchronization of first switching arrangement 12 and second switching arrangement 13.

From the Standpoint of industrial applicability, the load driving circuit device of the present invention is suitable not only for the purpose of driving electrical loads having two terminals such as a fuel pump driving device of an automobile, but is also suitable for driving brushless motor loads having three or more terminals or as a common mode noise suppression technique that can be used in drive circuits and so forth that use a known H bridge driver circuit.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof. Moreover, the technical effects and technical problems in the specification are exemplary and are not limiting. The embodiments described in the specification may have other technical effects and can solve other technical problems.

What is claimed is:

1. A load driving circuit device that controls a supply of power to an electrical load, comprising:
    a first switching arrangement connected between a terminal on a high potential side of a direct current power supply and a terminal of the electrical load;
    a second switching arrangement connected between a terminal on the low potential side of the direct current power supply and a further terminal of the electrical load;
    a control arrangement for controlling the first switching arrangement and second switching arrangement to disconnect each other simultaneously using respective PWM control signals having the same frequency and the same duty ratio; and
    a synchronization arrangement, comprising a first feedback circuit and a second feedback circuit, for synchronizing a disconnect timing of the first switching arrangement and a disconnect timing of the second switching arrangement wherein the first feedback circuit comprises a first capacitor in series with a first transistor and a second transistor, and the second feedback circuit comprises a second capacitor in series with a third transistor and a fourth transistor.

2. The load driving circuit device of claim 1, wherein the first feedback circuit is for switching the first switching arrangement from on to off when the second switching arrangement is switched from on to off, and for switching the first switching arrangement from off to on when the second switching arrangement is switched from off to on; and the second feedback circuit is for switching the second switching arrangement from on to off when the first switching arrangement is switched from on to off, and for switching the second switching arrangement from off to on when the first switching arrangement is switched from off to on.

3. The load driving circuit device according to claim 2, wherein the control arrangement simultaneously outputs a first-level first control signal and a third-level second control signal, and simultaneously outputs a second-level first control signal that is lower than the first-level and a fourth-level second control signal that is higher than the third-level; and the first switching arrangement comprises a first terminal connected to a terminal on the high potential side of the direct current power supply, a second terminal connected to one terminal of the electrical load, and a first control terminal for receiving a first control signal from the control arrangement, wherein, when the first control signal is first-level, the first-level first control signal turns off and blocks between the first terminal and the second terminal, and when the first control signal is second-level, the second-level first control signal turns on and connects between the first terminal and the second terminal; and the second switching arrangement comprises a third terminal connected to a terminal on the low potential side of the direct current power supply, a fourth terminal connected to the other terminal of the electrical load, and a second control terminal for receiving a second control signal from the control arrangement, wherein, when the second control signal is third-level, the third-level second control signal turns off and blocks between the third terminal and the fourth terminal, and when the second control signal is fourth-level, the fourth-level second control signal turns on and connects between the third terminal and the fourth terminal.

4. The load driving circuit device according to claim 3, wherein, when the second switching arrangement is off, the first feedback circuit applies the potential of the terminal on the high potential side of the direct current power supply to the first control terminal of the first switching arrangement; and when the potential of the first control terminal is the potential of the terminal on the high potential side of the direct current power supply, the first switching arrangement turns off; and when the first switching arrangement is off, the second feedback circuit applies the potential of the terminal on the low potential side of the direct current power supply to the second control terminal of the second switching arrangement; and when the potential of the second control terminal is the potential of the terminal on the low potential side of the direct current power supply, the second switching arrangement turns off.

5. A load driving circuit device that controls a supply of power to an electrical load, comprising:

a first switching arrangement connected between a terminal on a high potential side of a direct current power supply and a terminal of the electrical load;

a second switching arrangement connected between a terminal on the low potential side of the direct current power supply and a further terminal of the electrical load;

a control arrangement for simultaneously controlling the first switching arrangement and the second switching arrangement using respective PWM control signals having the same frequency and the same duty ratio;

a first feedback circuit for aligning the first switching arrangement with the second switching arrangement; and a second feedback circuit for aligning the second switching arrangement with the first switching arrangement;

wherein the first feedback circuit comprises a first capacitor in series with a first transistor and a second transistor, and the second feedback circuit comprises a second capacitor in series with a third transistor and a fourth transistor.

6. The load driving circuit device according to claim 5, wherein the control arrangement simultaneously connects the first switching arrangement and the second switching arrangement.

7. The load driving circuit device according to claim 5, wherein the control arrangement simultaneously disconnects the first switching arrangement and the second switching arrangement.

8. The load driving circuit device according to claim 5, wherein the control arrangement simultaneously outputs a first-level first control signal and a third-level second control signal, and simultaneously outputs a second-level first control signal that is lower than the first-level and a fourth-level second control signal that is higher than the third-level; and the first switching arrangement comprises a first terminal connected to a terminal on the high potential side of the direct current power supply, a second terminal connected to one terminal of the electrical load, and a first control terminal for receiving a first control signal from the control arrangement, wherein, when the first control signal is first-level, the first-level first control signal turns off and blocks between the first terminal and the second terminal, and when the first control signal is second-level, the second-level first control signal turns on and connects between the first terminal and the second terminal; and the second switching arrangement comprises a third terminal connected to a terminal on the low potential side of the direct current power supply, a fourth terminal connected to the other terminal of the electrical load, and a second control terminal for receiving a second control signal from the control arrangement, wherein, when the second control signal is third-level, the third-level second control signal turns off and blocks between the third terminal and the fourth terminal, and when the second control signal is fourth-level, the fourth-level second control signal turns on and connects between the third terminal and the fourth terminal.

9. The load driving circuit device according to claim 8, wherein the first feedback circuit comprises the first capacitor connected to the fourth terminal of the second switching arrangement and the first control terminal of the first switching arrangement; and the second feedback circuit comprises the second capacitor connected to the second terminal of the first switching arrangement and the second control terminal of the second switching arrangement.

10. The load driving circuit device according to claim 8, wherein, when the second switching arrangement is off, the first feedback circuit applies the potential of the terminal on the high potential side of the direct current power supply to the first control terminal of the first switching arrangement;

when the potential of the first control terminal is the potential of the terminal on the high potential side of the direct current power supply, the first switching arrangement turns off;

when the first switching arrangement is off, the second feedback circuit applies the potential of the terminal on the low potential side of the direct current power supply to the second control terminal of the second switching arrangement; and when the potential of the second control terminal is the potential of the terminal on the low potential side of the direct current power supply, the second switching arrangement turns off.

11. A load driving circuit device that controls a supply of power to an electrical load, comprising:

a first switching arrangement connected between a terminal on a high potential side of a direct current power supply and a terminal of the electrical load;

a second switching arrangement connected between a terminal on the low potential side of the direct current power supply and a further terminal of the electrical load;

a control arrangement for simultaneously controlling the first switching arrangement and the second switching arrangement using respective PWM control signals having the same frequency and the same duty ratio; and a synchronization arrangement, comprising a first feedback circuit and a second feedback circuit, for synchronizing the first switching arrangement and the second switching arrangement;

wherein the first feedback circuit comprises a first capacitor in series with a first transistor and a second transistor, and the second feedback circuit comprises a second capacitor in series with a third transistor and a fourth transistor.

12. The load driving circuit device according to claim 11, wherein the control arrangement simultaneously connects the first switching arrangement and the second switching arrangement.

13. The load driving circuit device according to claim 11, wherein the control arrangement simultaneously disconnects the first switching arrangement and the second switching arrangement.

14. The load driving circuit device of claim 11, wherein the synchronization arrangement comprises the first feedback circuit for switching the first switching arrangement from on to off when the second switching arrangement is switched from on to off, and for switching the first switching arrangement from off to on when the second switching arrangement is switched from off to on; and the second feedback circuit for switching the second switching arrangement from on to off when the first switching arrangement is switched from on to off, and for switching the second switching arrangement from off to on when the first switching arrangement is switched from off to on.

15. The load driving circuit device according to claim 14, wherein the control arrangement simultaneously outputs a first-level first control signal and a third-level second control signal, and simultaneously outputs a second-level first control signal that is lower than the first-level and a fourth-level second control signal that is higher than the third-level; and the first switching arrangement comprises a first terminal connected to a terminal on the high potential side of the direct current power supply, a second terminal connected to one terminal of the electrical load, and a first control terminal for receiving a first control signal from the control arrangement, wherein, when the first control signal is first-level, the first-level first control signal turns off and blocks between the first terminal and the second terminal, and when the first control signal is second-level, the second-level first control signal turns on and connects between the first terminal and the second terminal; and the second switching arrangement comprises a third terminal connected to a terminal on the low potential side of the direct current power supply, a fourth terminal connected to the other terminal of the electrical load, and a second control terminal for receiving a second control signal from the control arrangement, wherein, when the second control signal is third-level, the third-level second control signal turns off and blocks between the third terminal and the fourth terminal, and when the second control signal is fourth-level, the fourth-level second control signal turns on and connects between the third terminal and the fourth terminal.

16. The load driving circuit device according to claim 15, wherein the first feedback circuit comprises the first capacitor connected to the fourth terminal of the second switching arrangement and the first control terminal of the first switching arrangement; and the second feedback circuit comprises the second capacitor connected to the second terminal of the first switching arrangement and the second control terminal of the second switching arrangement.

17. The load driving circuit device according to claim 15, wherein, when the second switching arrangement is off, the first feedback circuit applies the potential of the terminal on the high potential side of the direct current power supply to the first control terminal of the first switching arrangement; and when the potential of the first control terminal is the potential of the terminal on the high potential side of the direct current power supply, the first switching arrangement turns off; and when the first switching arrangement is off, the second feedback circuit applies the potential of the terminal on the low potential side of the direct current power supply to the second control terminal of the second switching arrangement; and when the potential of the second control terminal is the potential of the terminal on the low potential side of the direct current power supply, the second switching arrangement turns off.

* * * * *